March 20, 1962 T. J. REY 3,026,515
FREQUENCY MODULATED RADAR
Filed Sept. 21, 1956

THOMAS J. REY
INVENTOR.

BY Leonard Bloom
AGENT

United States Patent Office 3,026,515
Patented Mar. 20, 1962

3,026,515
FREQUENCY MODULATED RADAR
Thomas J. Rey, 1245 Guildford Road, Glen Burnie, Md., assignor of one-third to Leonard Bloom, Baltimore, Md.
Filed Sept. 21, 1956, Ser. No. 611,224
2 Claims. (Cl. 343—14)

The present invention relates to radar systems, and more particularly, to an improved frequency modulated radar system for deriving range or height information from a distant target.

Frequency modulated radars are well-known in the art. Generally, they operate on the following principle: A frequency modulated carrier wave is radiated from an antenna and illuminates a distant target. In the case of radar altimeters, the Earth constitutes the target. The illuminated target reflects part of the energy impinging upon it, and the reflected wave is received and is mixed with a portion of the transmitted wave. The transmitted wave being modulated at a linear rate, within certain limits, the instantaneously received wave is at a different frequency than the transmitted wave. When the reflected wave is mixed with a portion of the transmitted wave, a difference or beat signal is produced. This beat frequency is proportional to the delay or transit time between the radar and the target; or in other words, it is a measure of the distance or range of the target. Present-day frequency modulated radars measure the instantaneous beat frequency or else the average beat frequency over a certain period as an indication of target range.

Certain classes of conventional frequency modulated radars that are used as altimeters are more fully discussed in the Transactions of the Institute of Radio Engineers, Volume ANE-1, No. 2, June, 1954. The frequency of the carrier wave is in the order of 4000 megacycles, and it is necessary to use modulated frequency deviations in the order of 50 megacycles or more. The use of these large frequency deviations entails difficult circuit problems and necessitates the use of special generators or modulators, such as special magnetrons of the vibrating reed type. On the other hand, if only a moderate frequency deviation is employed, the rate of zero crossings of the beat frequency (the "zero count") alters discontinuously with range and must be rendered continuous. For example, the reflected signal must be mixed, not with a portion of the transmitted signal, but with a signal derived from the latter through the introduction of an artificial Doppler effect. Difficulties arise in generating this frequency-shift effect and in eliminating the transmitted signal from the detector.

Accordingly, it is an object of the present invention to provide an improved frequency modulated radar system.

It is another object of the present invention to provide an improved frequency modulated radar system that employs a moderate frequency deviation and eliminates the need for special oscillator or modulator devices.

It is a further object of the present invention to provide an improved frequency modulated radar system that eliminates the necessity for generating an artificial Doppler or frequency shift effect.

It is yet another object of the present invention to provide an improved frequency modulated radar system that indicates range or height without the necessity of measuring the instantaneous or average beat frequency.

In accordance with the teachings of the present invention, the phase of a Fourier frequency component in the beat signal is compared with the phase of the modulation frequency, and the phase delay that said component has incurred in its travel to the reflector and back is an indication of the range of the reflector.

The foregoing objects, advantages, construction, and operation of the present invention will become more readily apparent from the following description and accompanying drawing, in which.

Figure 1:
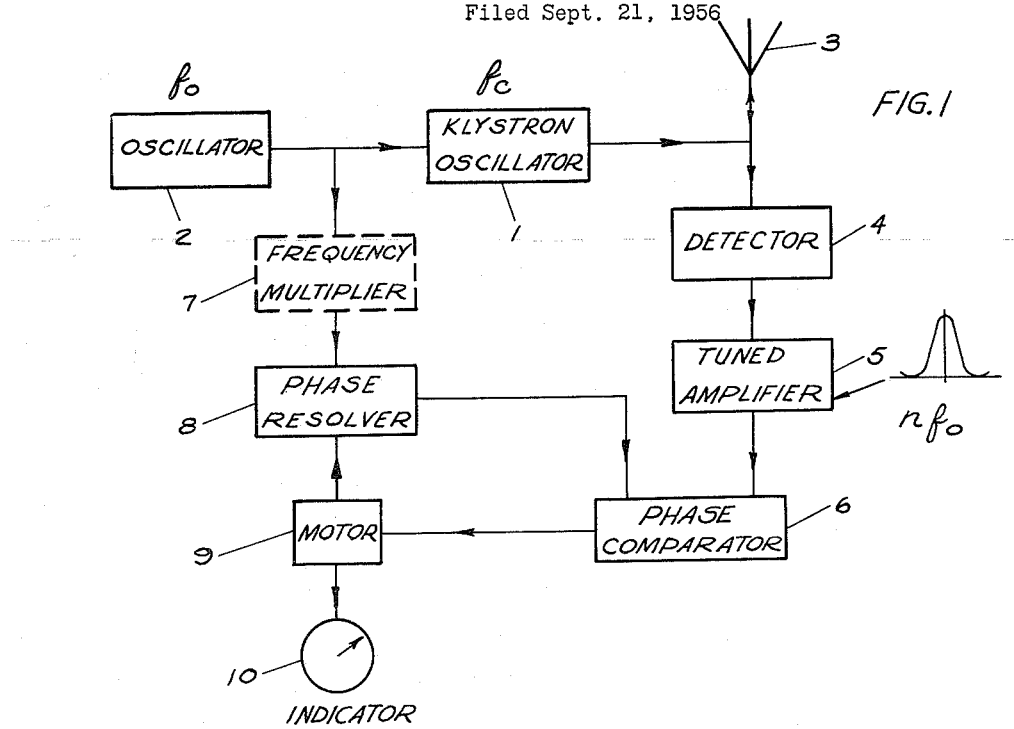
FIGURE 1 is a schematic diagram of one form of the present invention.

With reference to FIGURE 1, a source of high frequency oscillations 1 (which may be a Klystron oscillator) generates frequency $f_c$ and is frequency modulated by a source 2 of relatively low frequency oscillations $f_0$. The frequency modulated wave is radiated by antenna 3, which also serves to receive the reflected wave. However, for maximum range sensitivity, separate transmitting and receiving antennas could be used. The received signal is mixed with a portion of the transmitted wave in detector 4. This is shown to be coupled directly to the oscillator 1 and antenna 3 for simplicity, but other means of coupling are well-known and are equally applicable to the present invention. Detector 4 comprises a low pass filter for eliminating components whose frequencies are in the order of $f_c$ or higher; and detector 4 feeds amplifier 5, which is tuned to the n'th harmonic of $f_0$.

The output of tuned amplifier 5 provides one of the two inputs of phase comparator 6. The other input of phase comparator 6 is a phase comparison signal that is derived by sampling the modulation frequency of oscillator 2 by means of frequency multiplier 7 and phase resolver 8. The comparison signal may be applied directly to phase resolver 8 if $n=1$; if $n$ is not equal to 1, then the comparison signal is applied through frequency multiplier 7.

Phase resolver 8 may take the form of a system of coils which are at right angles to each other in space and are fed from oscillator 2 (and the intervening frequency multiplier 7 if $n$ is not equal to 1) in time quadrature. The output of phase resolver 8 may be taken from a coil which is rotated by means of motor 9. The drive signal for motor 9 is supplied by the output of phase comparator 6, and the motor 9 comes to rest when the two input signals of phase comparator 6 are of equal phase. The shaft position of motor 9 is then an indication of the phase delay which the signal from the source 1 has suffered in its path to the reflector and back. A suitable indicator 10 may be coupled to the shaft of motor 9 to display the range.

Phase comparator 6 may for example, be a bridge circuit of which two arms are equal resistors and the other two are similar tubes. The grids of the tubes comprise the two inputs of such a phase comparison bridge; these two inputs being the outputs of tuned amplifier 5 and phase resolver 8, which could first pass through suitable limiters to insure that the signals at the two grids are of equal amplitude. The bridge would balance when the input signals to the grids of the tubes are in phase.

When the input signals to phase comparator 6 are out of phase, then an error signal is developed. This error signal is fed to motor 9 and causes it to rotate in such a manner that the rotating coil of phase resolver 8 causes the phase resolver to present a phase that is identical to the output of tuned amplifier 5. The bridge of the phase comparator 6 thus balances when its two inputs are of equal phase. The amount that the shaft of motor 9 rotates in order to balance the bridge of phase comparator 6 is thus an indication of phase delay or range and may be presented by a suitable indicator 10.

If the phase shift of the phase resolver 8 is less than a quarter wavelength at the modulation frequency, this phase shift is a unique indication of range. However, such a restriction is not necessary in certain circumstances, as when the system forms a continuously operating altimeter whose zero is set at the beginning of flight.

Moreover, the invention is not restricted to the use of only one value of modulation frequency in a given apparatus. The choice of two or more values of modulation frequency may be desirable in a given instrument. For example, in an aircraft altimeter, a lower modulation frequency may be required i level flight than in ascent or descent. Since the phase comparison arrangement previously described is essentially independent of the frequency, the choice of the latter may be effected manually or automatically (by changing the appropriate tuned circuits) whenever the displayed value of height passes through a critical point. The display scale could be changed at the same time.

Figure 2:
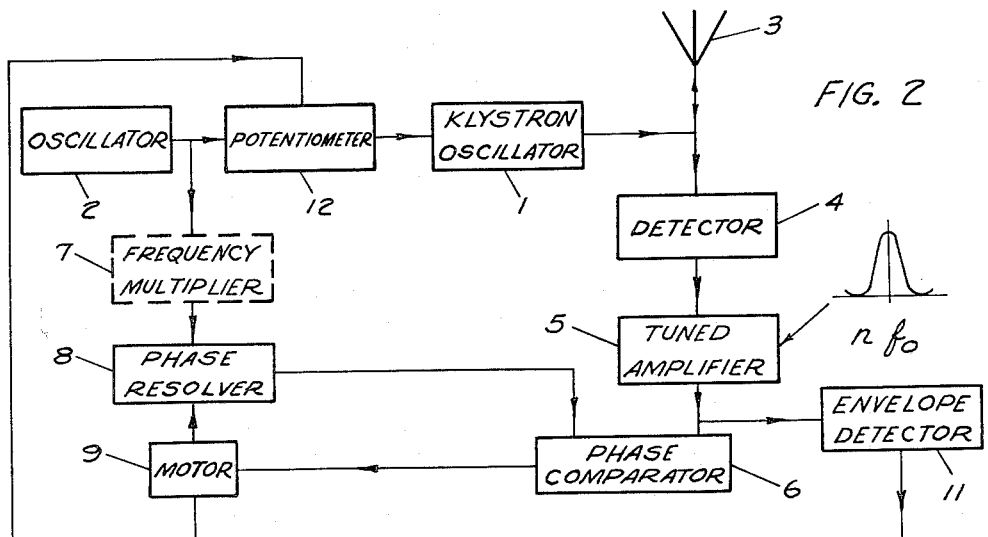
FIGURE 2 is a schematic diagram of a preferred embodiment of the present invention in which the signal-to-noise ratio of the system has been optimized.

As shown in FIGURE 2, the signal-to-noise ratio of the system may be optimized by monitoring the modulation index $m$. Envelope detector 11 monitors the output of tuned amplifier 5 and feeds a control signal to potentiometer 12. Potentiometer 12 is located between the modulating oscillator 2 and the source 1, and it adjusts the modulation voltage to give the maximum amplitude at the output of amplifier 5 if this voltage falls below a pre-set level. Other means of optimizing the signal-to-noise ratio are well-known. For example, the spurious amplitude modulation arising in the source 1 may be minimized by feeding part of the output of source 1 directly to an amplitude detector. The resulting signal is amplified and applied to the source 1 in such a way as to minimize the amplitude modulation.

The signal-to-noise ratio may be further improved by making the pass-bend of the tuned amplifier 5 wider than twice the highest Doppler frequency expected; amplifier 5 is followed by a limiter and an amplifier or filter whose bandwidth is less than that of amplifier 5 but not less than twice the highest Doppler frequency expected. A clipper or amplitude discriminator then applies the upper or lower part of the output from the narrower filter. This slice may be amplified and limited again for application to the phase comparator.

A phase comparator circuit of greater precision than that described above consists of what is essentially a polarity reversing switch between the motor 9 and the driving voltage supply, said switch being operated by the two signals whose phase is to be compared. The switch may take the form of a bistable electronic circuit, one of its states being set up when one of the signals goes positive, say, and the other state being set up when the other signal goes negative. If the bistable circuit is of the well-known two-tube type and the motor is connected between their plates, the average motor current is zero when the phase difference between the two signals is zero or a multiple of 360°.

The operation of the present invention may be more clearly understood by an examination of its underlying mathematical theory.

The outgoing signal has the instantaneous value:

(1) $\qquad V_0(t) = a \cos(\omega_c t + m \sin \omega_0 t + \phi)$ where $a$ = peak amplitude $\frac{\omega_c}{2\pi} = f_c$ = carrier frequency $\frac{\omega_0}{2\pi} = f_0$ = modulation frequency $m$ = index of modulation frequency $\phi$ = an arbitrary phase angle The reflected signal is given as follows:

(2) $V_r = ab \cos[\omega_c(t-T) + \theta_D + m \sin \omega_0(t-T) + \phi]$ where $b$ = a coefficient that depends on height and reflectivity
$T$ = time delay on the round trip to ground and back
$\theta_D$ = a phase that varies with Doppler frequency $\omega_D$.

Now, denoting by:

$H$ = height above ground
$C$ = speed of light

Then, (3) $$T = \frac{2H}{C}$$

(4) $$\omega_D = \frac{\omega_c}{C} \frac{dH}{dt}$$

The output of the first detector contains the product $V_0 V_r$. The difference term therein has the time variation:

(5) $V_d = \frac{1}{2} \cos\left(2m \sin \frac{\omega_0 T}{2} + \cos \omega_0\left(t - \frac{T}{2}\right) + \theta_D\right)$ Now, let $J_n$ = Bessel function of the first kind, order $n$ and argument $$2m \sin \omega_0 \frac{T}{2}$$

Then $V_d$ can be expanded in a Fourier series of frequency terms $$n\omega_0 \pm \frac{d\theta_D}{dt}$$

where $n$ is an integer.

A typical component of $V_d$ is:

$$V_n = k J_n \sin \theta_D \cos n\omega_0\left(t - \frac{T}{2}\right)$$

When this is mixed with the delayed modulation signal $$\cos\left(\omega_0 t - \psi - \frac{\pi}{2}\right)$$

the result is the signal that has amplitude proportional to $$\sin\left(\psi - \omega_0 \frac{T}{2}\right)$$

and this vanishes at all times when $$\psi = \frac{\omega_0}{2} + \text{integer } \pi$$

Hence, if the range is equal to or less than ¼ × wavelength at $\omega_0$, $\phi$ is a unique measure of $T$.

Obviously, many modifications and variations of the present invention are possible in the light of the above teachings. For example, the invention may be practiced equally well using phase modulation principles in place of the frequency modulated system herein described. It is therefore to be understood that within the scope of the appended claims the invention may be practiced otherwise than as specifically described.

I claim:
1. A frequency-modulated, continuous wave radar system for measuring the range of a distant object, comprising, a first oscillator, a second oscillator electrically-coupled to said first oscillator for modulating said first oscillator in frequency with one sinusoid so as to produce a frequency-modulated continuous wave, a potentiometer electrically-coupled between said first and second oscillators for adjusting the modulating voltage in response to a control voltage, a single antenna directly coupled electrically to the output of said first oscillator for both radiating said wave into free space and for receiving the wave reflected from the distant object, detection means electrically-coupled to said single antenna and to said first oscillator for mixing said reflected wave with a por- tion of the radiated wave, whereby a beat signal is produced, an amplifier electrically-coupled to the output of said detection means and being tuned to the modulation frequency component in said beat signal, a phase comparison network electrically-coupled between the outputs of said amplifier and said second oscillator for comparing the phase of the modulation frequency component in said beat signal with the instantaneous phase of the modulation frequency, whereby the relative phase difference is a measure of the distance to the object, an envelope detector electrically-coupled to the output of said amplifier for monitoring the output of said amplifier and for extracting therefrom a control voltage, and means to feed said control voltage to said potentiometer, whereby the modulation voltage is adjusted to render maximum amplitude at the output of said amplifier.

2. A frequency-modulated, continuous wave radar system for measuring the range of a distant object as described in claim 1, wherein said amplifier is tuned to a harmonic of the modulation frequency, and said phase comparison network compares the phase of the output of said amplifier with the instantaneous phase of an identical harmonic of the modulation frequency.

References Cited in the file of this patent
UNITED STATES PATENTS

| | | |
|---|---|---|
| 2,424,796 | Carlson | July 29, 1947 |
| 2,430,038 | Wertz | Nov. 4, 1947 |
| 2,502,454 | Grieg | Apr. 4, 1950 |
| 2,540,406 | Braden | Feb. 6, 1951 |
| 2,641,754 | Clegg | June 9, 1953 |
| 2,769,158 | Schultz | Oct. 30, 1956 |

OTHER REFERENCES

Sarbacher: Encyclopedic Dictionary of Electronics and Nuclear Engineering (Prentice-Hall, Englewood Cliffs, N.J., 1959), page 139.